United States Patent
Fischer et al.

(10) Patent No.: US 8,605,332 B2
(45) Date of Patent: Dec. 10, 2013

(54) IMAGE PROCESSING METHOD AND APPARATUS

(75) Inventors: Mani Fischer, Haifa (IL); Doron Shaked, Haifa (IL); Craig Breen, Rehovot (IL); Dror Kella, Rehovot (IL); Gidi Amir, Rehovot (IL)

(73) Assignee: Hewlett-Packard Development Company, L.P., Houston, TX (US)

( * ) Notice: Subject to any disclaimer, the term of this patent is extended or adjusted under 35 U.S.C. 154(b) by 586 days.

(21) Appl. No.: 12/597,254

(22) PCT Filed: Apr. 25, 2007

(86) PCT No.: PCT/US2007/009960
§ 371 (c)(1),
(2), (4) Date: Mar. 4, 2010

(87) PCT Pub. No.: WO2008/133610
PCT Pub. Date: Nov. 6, 2008

(65) Prior Publication Data
US 2010/0177353 A1 Jul. 15, 2010

(51) Int. Cl.
*H04N 1/40* (2006.01)
(52) U.S. Cl.
USPC .......................... 358/3.01; 358/1.18; 382/255

(58) Field of Classification Search
USPC .......................................................... 358/3.01
See application file for complete search history.

(56) References Cited

U.S. PATENT DOCUMENTS

| 6,144,461 | A | 11/2000 | Crean et al. |
| 6,167,166 | A | 12/2000 | Loce et al. |
| 2003/0206281 | A1* | 11/2003 | Jain .................................. 355/53 |
| 2003/0210409 | A1 | 11/2003 | Huang et al. |
| 2004/0061877 | A1* | 4/2004 | Bhattacharjya ................ 358/1.8 |

FOREIGN PATENT DOCUMENTS

EP 0 946 048 A2 9/1999

\* cited by examiner

*Primary Examiner* — Twyler Haskins
*Assistant Examiner* — Brendan McCommas

(57) ABSTRACT

An image processing method (300) for converting an original image (601) into a final, pixelated image (610) suitable for printing on a printer arranged to print two-tone images and capable of printing partial area exposed pixels, comprises antialiasing (301) the original image (601) into an intermediate pixelated image (605) comprising greyscale pixels having assigned greyscale values. The method comprises the further-step, of translating (302) the intermediate image (605) into the final, pixelated image (610) by translating the assigned greyscale values into partial exposure values indicative of the amount of desired pixel area for a corresponding pixel or pixels in the final image.

12 Claims, 7 Drawing Sheets

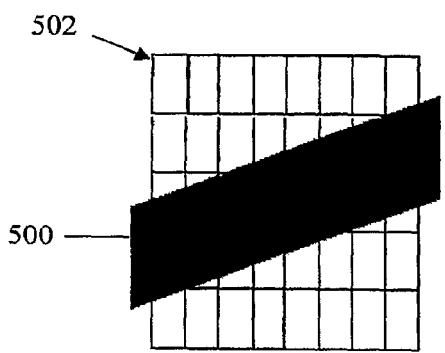
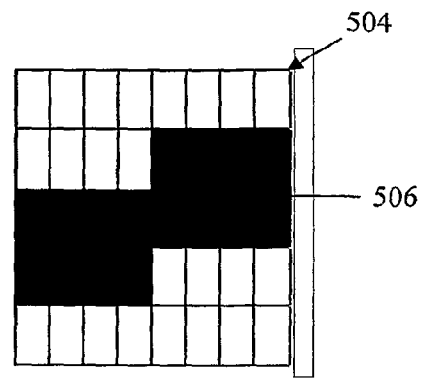
*Fig. 5a*  *Fig. 5b*
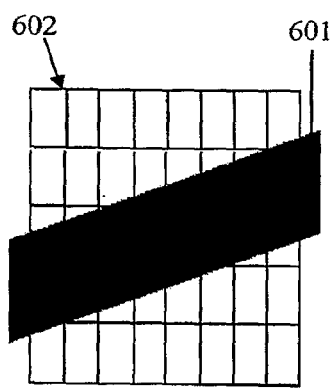
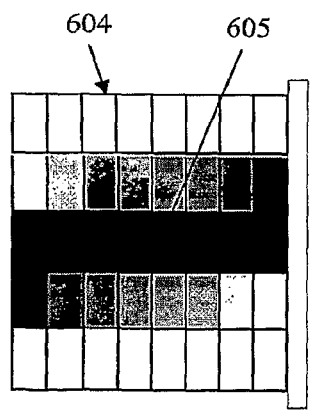
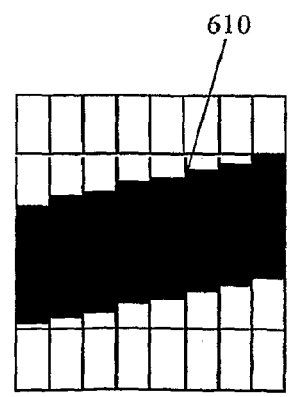
*Fig. 6a*  *Fig. 6b*  *Fig. 6c*

```
710 ──── Receive information related to
          intermediate pixels
            │
            ▼
720 ──── Determine amount of ink to apply
          at a location of the pixel
            │
            ▼
730 ──── Vary the intensity of the charge on
          photoconductive surface at a
          location of the pixel
```

| RECORD NUMBER | GREYSCALE VALUE | LASER INTENSITY ||
|---|---|---|---|
| | | POWER MODULATION LEVEL | POWER WIDTH MODULATION VALUE |
| 0 | 0.000 | 0.000 | 0.000 |
| 1 | 0.125 | 0.125 | 0.125 |
| 2 | 0.250 | 0.250 | 0.250 |
| 3 | 0.375 | 0.375 | 0.375 |
| 4 | 0.500 | 0.500 | 0.500 |
| 5 | 0.625 | 0.625 | 0.625 |
| 6 | 0.750 | 0.750 | 0.750 |
| 7 | 0.875 | 0.875 | 0.875 |
| 8 | 1.000 | 1.000 | 1.000 |
| ● | ● | | |
| ● | ● | | |
| ● | ● | | |
| N | --- | | |

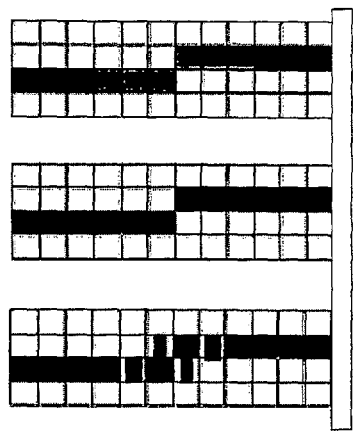
*Fig. 9a*
*Fig. 9b*
*Fig. 9c*
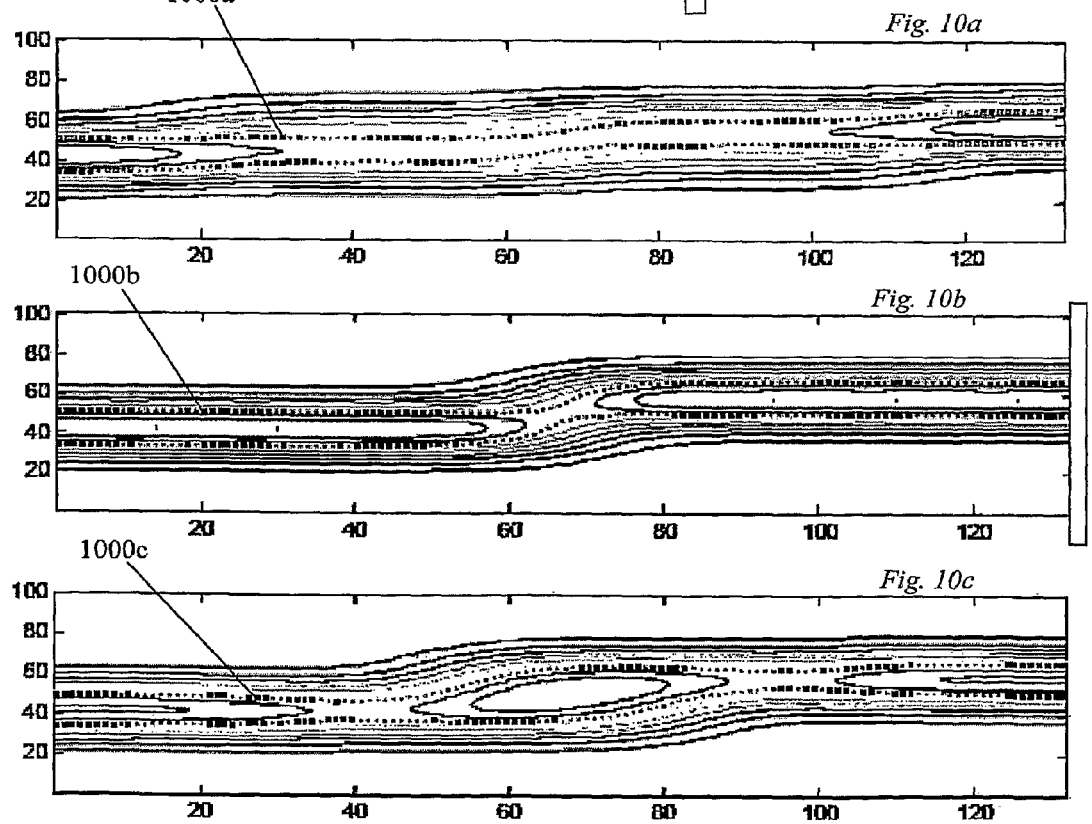
*Fig. 10a*
*Fig. 10b*
*Fig. 10c*

IMAGE PROCESSING METHOD AND APPARATUS

The present invention relates to an image processing method and apparatus.

For the purposes of this specification, a two-tone image is one which has areas of at least two different contrasting tone (e.g. black and white or grey and white or dark grey and light grey or red and purple).

Embodiments of the present invention are described with reference to the accompanying drawings, in which:

FIGS. 5a and 5b are schematic diagrams showing pixel grid illustrations of an image rendered using a method not according to an embodiment of this invention;

FIGS. 6a, 6b and 6c are schematic diagrams showing pixel grid illustrations of the original image of FIG. 5a rendered using a method according to an embodiment of this invention;

Figure 11:
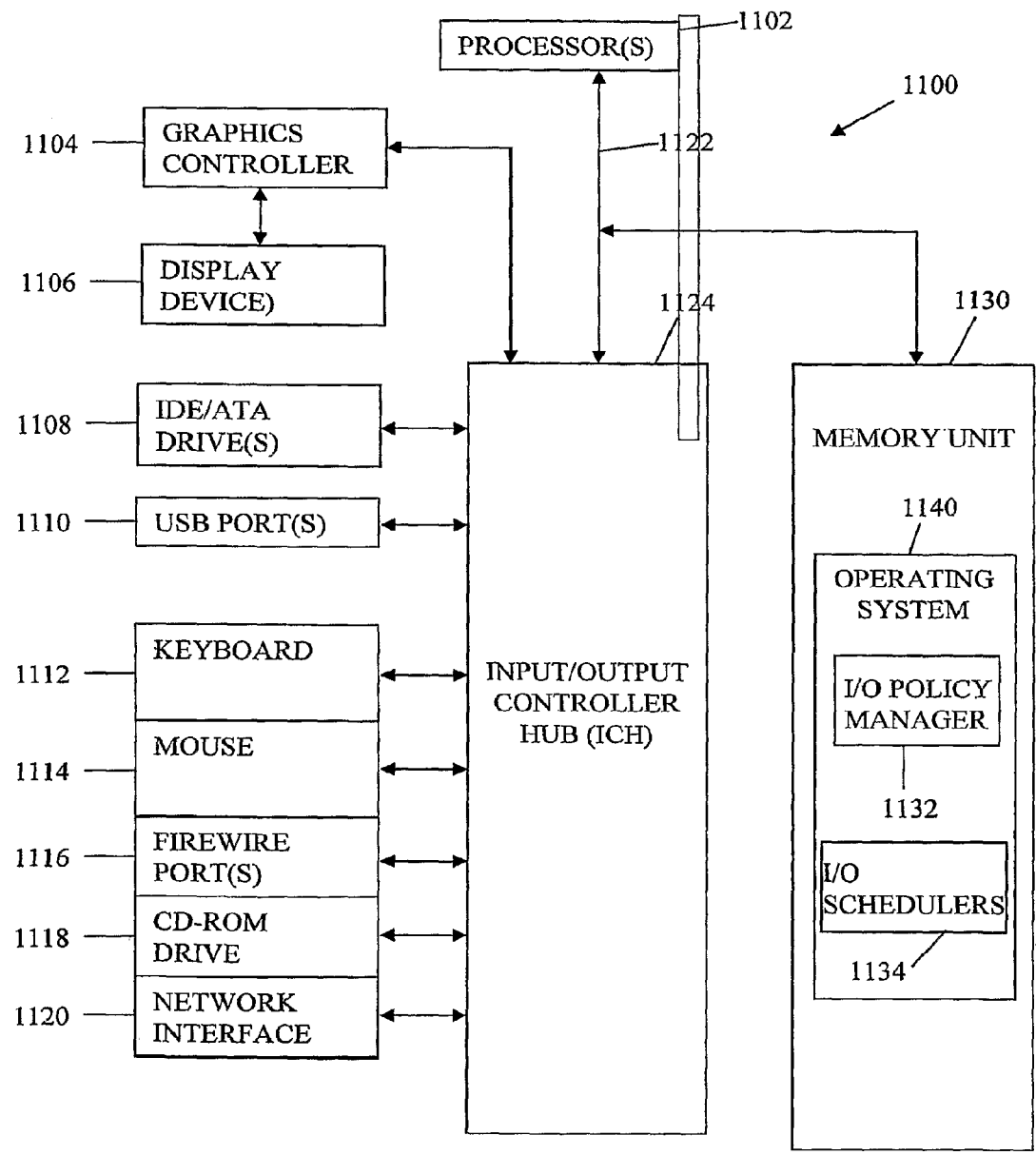

FIGS. 9a, 9b, and 9c show schematic representations of rendered pixel images having been rendered according to a method according to this invention, a first alternative method (not according to this invention) and a second alternative method (not according to this invention) respectively;

FIGS. 10a, 10b and 10c show light profiles corresponding to the pixel arrangements of FIGS. 9a, 9b and 9c respectively; and FIG. 11 illustrates an example computer system used in conjunction with certain embodiments of the invention.

In the following description, the drawings illustrate specific embodiments of the invention sufficiently to enable those skilled in the art to practice it. Other embodiments may incorporate structural, logical, electrical, process, and other changes. Examples merely typify possible variations. Individual components and functions are optional, and the sequence of operations may vary. Portions and features of some embodiments may be included in or substituted for those of others. The scope of the invention encompasses the full ambit of the claims and all available equivalents. The following description is, therefore, not to be taken in a limited sense, and the scope of the embodiments of the present invention is defined by the appended claims. For example, the embodiment described below (with reference to FIG. 1) refers to a dry electrophotographic printer. The invention is equally applicable to liquid electrophotographic printers (such as HP Indigo presses), which use liquid ink.

If an aspect of the invention is claimed in one category, corresponding protection is also sought in different categories (e.g. method, apparatus, systems; data carrier carrying software etc).

Figure 1:
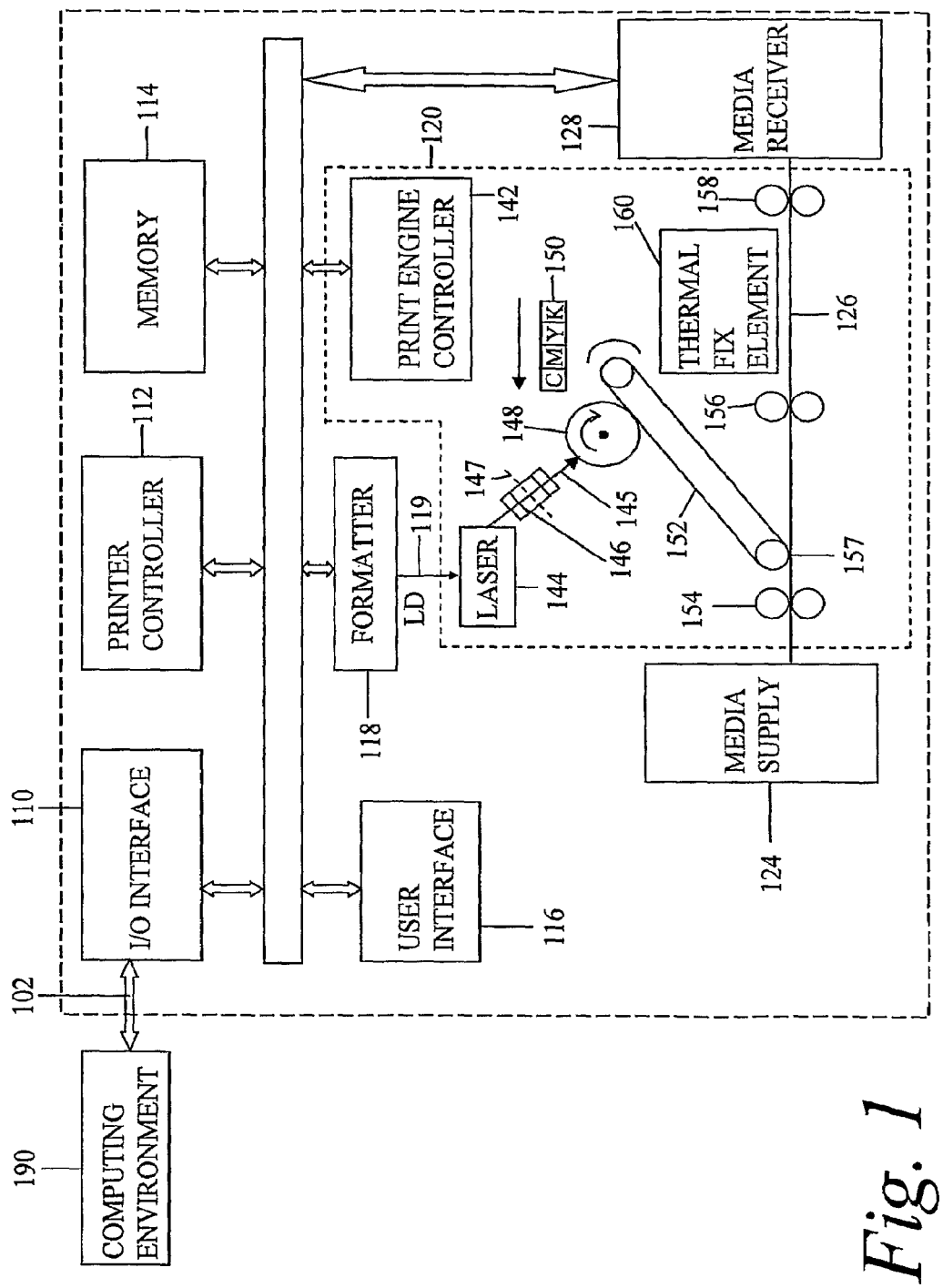
FIG. 1 is a functional block diagram of a printer, according to an embodiment of this invention.

FIG. 1 is a functional block diagram of a printer 100, according to an embodiment of this invention. A system of the present invention includes any system for providing a two-tone image. A two-tone image provided by such a system in digital format may be stored in a memory device or communicated by a signal in serial or in parallel. When a two-tone image is to be transferred to a tangible medium, the system may include additional functions such as electrophotographic printing. For example, a printer according to various aspects of the present invention primarily includes an interface for receiving a description of data to be printed, a bus for communicating the data to a formatter, a paper path including a print engine for handling paper and for printing an image on the paper as provided by the formatter. More particularly, exemplary printer 100 of FIG. 1 includes Input/Output ("I/O") interface 110, a printer Controller 112, a memory 114, a user interface 116, a formatter 118, a print engine 120, a bus 122, a media supply 124, a paper path 126, and a media receiver 128.

The I/O interface 110 couples a printer 100 to a rendering device 200 (shown in FIG. 2), a computing environment 190 for receiving a description of data to be printed. The computing environment 190 can include a computer network or a stand-alone computer or any other computer system. The rendering device can include the computing environment 190. The I/O interface 110 includes circuits for receiving commands and data to be printed and for providing status of printer operation. For example, the I/O interface 110 couples printer 100 to a computing environment 190, such as a network or stand-alone computer, via line 102 and includes any conventional circuits for receiving command messages and data messages and for providing status messages according to various protocols. One exemplary protocol is Printer Control Language ("PCL") which is available from Hewlett Packard Company of Palo Alto, Calif. in the United States of America. Other protocols also exist.

A user interface 116 provides controls and display's that facilitate operator interaction with the printer 100. The user interface 116 includes circuits for various control switches (or a keyboard), an alphanumeric/graphic display, and various discrete indicators. Control switches may include, for example, on-line and reset. Displays may include, for example, paper status (e.g., empty, jammed) and protocol status.

The printer controller 112 provides overall control of printing functions including preparation of commands for the formatter 118, the print engine 120, and user interface 116 in response to commands received via the I/O interface 110. In one embodiment, the printer controller 112 includes a microprocessor circuit programmed to perform methods including, for example, receiving and sending messages via the bus 122 and the I/O interface 110, sensing operator controls and providing operator information displays via bus 122 and user interface 116, and controlling the cooperation of formatter 118 and print engine 120 by receiving status from each via bus 122 and commanding a sequence of operations to accomplish image formation and printing.

The memory 114 provides storage for information such as program instructions, constants, and variables. The memory device 114 includes any device capable of storage of information or any combination of devices capable of storage of information. In one embodiment, memory 114 includes a semiconductor device. In another embodiment, memory 114 includes a magnetic disk memory device. The memory 114, in some embodiments, includes nonvolatile memory devices, such as an EEPROM or CDROM. The memory device 114 includes any device capable of storage of information or any combination of devices capable of storage of information. Constants and variables include tables of information organized as data structures, indexed in any convenient manner. Examples include an input bit map, color table, output pixel geometry table, an image buffer, or a table look-up associating laser power values with developing selected amounts of toner or ink. The constants, variables or tables can be organized, stored, and accessed using one or more data structures, arrays, linked lists, files, FIFO buffers, or the like.

The bus 122 is primarily controlled by printer controller 112 and includes, in one embodiment, a parallel digital communication bus. The printer controller 112 communicates via bus 122 with the I/O interface 110, the user interface 116, the memory 114, the formatter 118, the print engine 120, the media supply 124, and the media receiver 128 by sending commands and receiving status.

A paper path 126 of a printer 100 includes various sensors and media handling devices for passing roll or sheet media from a media supply 124 through the print engine 120 and to a media receiver 128. Any type of media can be used in the printer 100, including, for example, paper, transparency, film, or a plate for use in another printing process. The paper path 126 extends from media supply 124, passes through media handler 154; comes in contact with transfer belt 152 at point 157, passes through a media handler 156, passes by a thermal fix element 160, passes through a media-handler 158, and extends into the media receiver 128. The temperature, humidity, orientation, media sheet counting, and media type verification, are monitored and controller by electronics (not shown) in print engine 120 at various positions along paper path 126.

The media supply 124 responds to conventional commands from printer controller 112 to provide sheet media or advance roll media as requested. The media receiver 128 can provide post-printing functions affecting media, for example, stapling, hole punching, gluing, stitching, or other media finishing operations.

The print engine 120 includes a mechanism for forming an image on media. For example, print engine 120 receives commands directing printing operations from bus 122 and includes an electrophotographic printing mechanism for printing text and graphics on media from the media supply 124. The print engine 120 prints graphics, according to various aspects of the present invention, by printing one or more two-tone images. The print engine 120 includes a print engine controller 142, a laser 144, a rotating mirror 146, a photoconductive drum 148, a toner or ink dispenser 150, a transfer belt 152, the thermal fix element 160, and the media handlers 154, 156, and 158.

The print engine controller 142 includes any circuit for coupling a print engine 120 to a communication bus 122 for receiving control messages and providing status messages. The print engine controller 142 includes, in one embodiment, a microprocessor based control circuit for controlling various power supplies and motors, and for coordinating the sequence of operations that result in the transfer of an image, such as a halftone image or hybrid halftone image, onto media as it travels along the media path 126.

To form a two-tone image on media, the print engine 120 performs an electrophotographic printing process in response to laser drive signal LD conveyed from the formatter 118 to the print engine 120 on a line 119. The laser drive signal ("LD") conveys in serial a halftone image in digital format. The laser 144 receives signal LD and provides modulated laser light directed toward rotating mirror 146. The laser light is modulated in several ways. The laser light is modulated by either being "on" or "off".

In addition, if the laser light is on, the laser light is modulated in terms of intensity so that lesser than a full amount of power is delivered by the laser 144 to a photoconductive drum 148. The laser exposure can be modulated using either pulse width modulation or using laser power modulation. A rotating mirror 146 includes a six-faceted mirror assembly that rotates on an axis 147, so that modulated laser light forms a beam 145 that scans across the length of the photoconductive drum 148. The photoconductive drum 148 holds an electrostatic charge distributed oh the surface of the drum. As the photoconductive drum 148 rotates on its lengthwise axis (not shown) each scan depletes a portion of this charge in accordance with the laser modulation. Each such portion is developed by the deposition of toner or ink from dispensers 150 onto the photoconductive drum 148. Dispensed toner or ink is transferred from the photoconductive drum 148 to the transfer belt 152 and then from the transfer belt 152 to media at a point 157. In an example embodiment that uses toner, a thermal fix element 160 applies heat to fix the toner to the media.

Black and white printing, in one embodiment, is accomplished by forming a two-tone image on the photoconductive drum 148. After the image is written onto the photoconductive drum 148, a suitable toner is dispensed and transferred to the transfer belt 152. The photoconductive drum 148 is then initialized for a subsequent image. When toner for the image has been transferred to the transfer belt 152, for one embodiment, toner is then transferred onto media at the point 157 and fixed by the thermal fix element 160. It should be noted that in some embodiments, ink or pigment or another substance can be substituted for toner.

The formatter 118, in one embodiment, includes any circuit for providing data that defines the two-tone image. The formatter 118 includes a microprocessor circuit that cooperates with the memory 114. When the I/O interface 110 receives a description of data to be printed, a bit map description of that data is provided by the printer controller 112 and stored in the memory 114. The formatter 118, reads the bit map description, prepares a two-tone image description, and can store the two-tone image description in the memory 114. The formatter 118 also provides laser drive signal LD on line 119 to laser 144 for modulating laser beam 145 in accordance with the two-tone image description to provide a two-tone image.

The printer 100 can be a stand-alone printer or can be part of a device that includes a printing function. Examples of devices that include a printing function include a copier, a multifunction printer ("MFP"), and commercial presses using dry toner or liquid ink. Some MFPs include a scanner, a printer, and a facsimile device.

Figure 2:
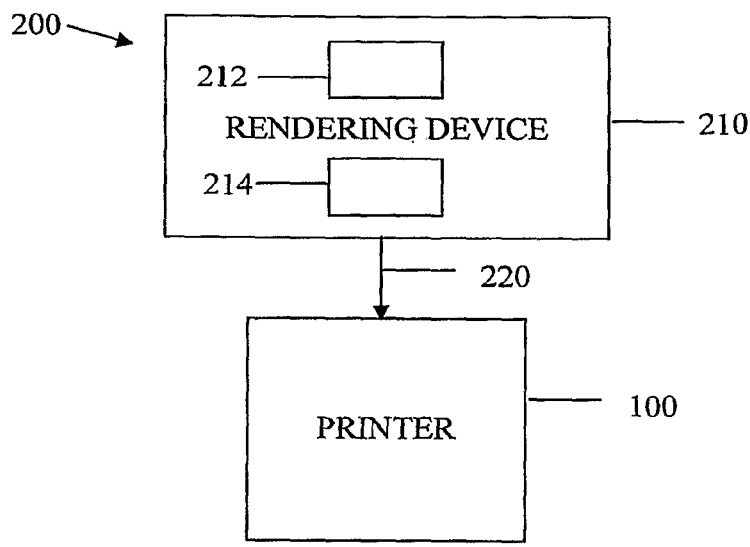
FIG. 2 is a system including a rendering device and a printer, according to an embodiment of this invention.

FIG. 2 is a schematic diagram of a system 200 which includes a rendering device 210 and a printer 100. The rendering device 210 provides control and displays that facilitate rendering of an original image. The rendering device 210 includes circuits for controlling the rendering process. One such circuit may include a microprocessor 212. The rendering device 210 may also include a sensor 214 that senses the original image on an optical basis or may receive an original digital data file. The rendering device 210 senses the original image, divides the original image into pixels and determines pixel values for the image. In other words, the rendering device 210 digitizes the original image and produces an output signal 220 that includes the location of the pixels as well as other related values associated with the pixels derived from the rendering device 210. The output 220 of the rendering device 210 is input to the printer 100. In one embodiment, the output 220 is passed to the printer 100 via the line 102 that couples to the I/O interface 110 (shown in FIG. 1).

Figure 3:
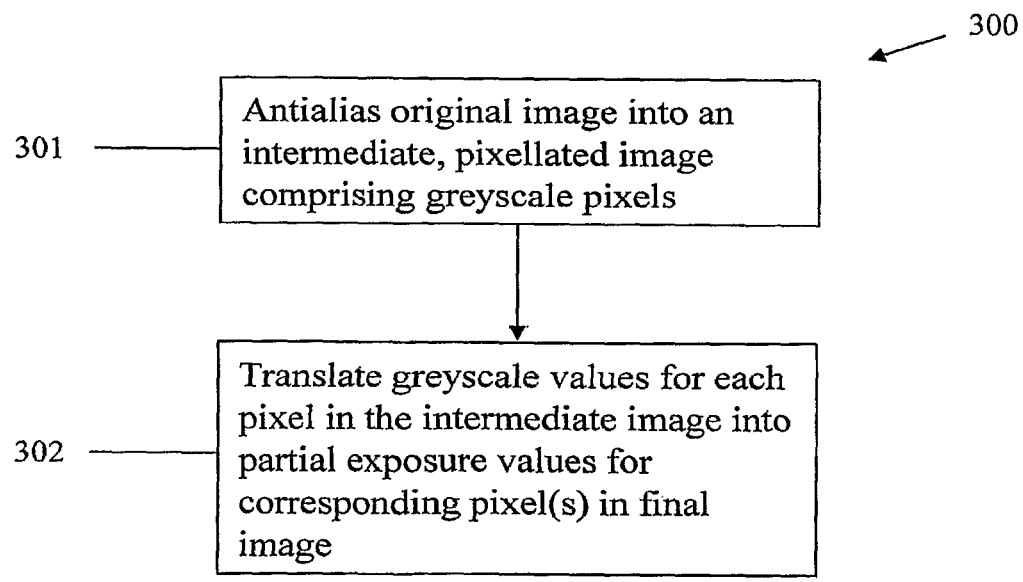
FIG. 3 is a flow diagram illustrating a method for rendering an object, according to an embodiment of this invention.

FIG. 3 is a diagram illustrating a method 300 for rendering an object according to an example embodiment. The method 300 comprises initialising 301 an original object image into an intermediate pixelated image comprising greyscale pixels. At a next stage, the method 300 comprises translating 302 the greyscale values which have been assigned to each pixel in the intermediate image into partial area exposure values for a corresponding pixel (or pixels) in a final, rendered image.

Figure 4:
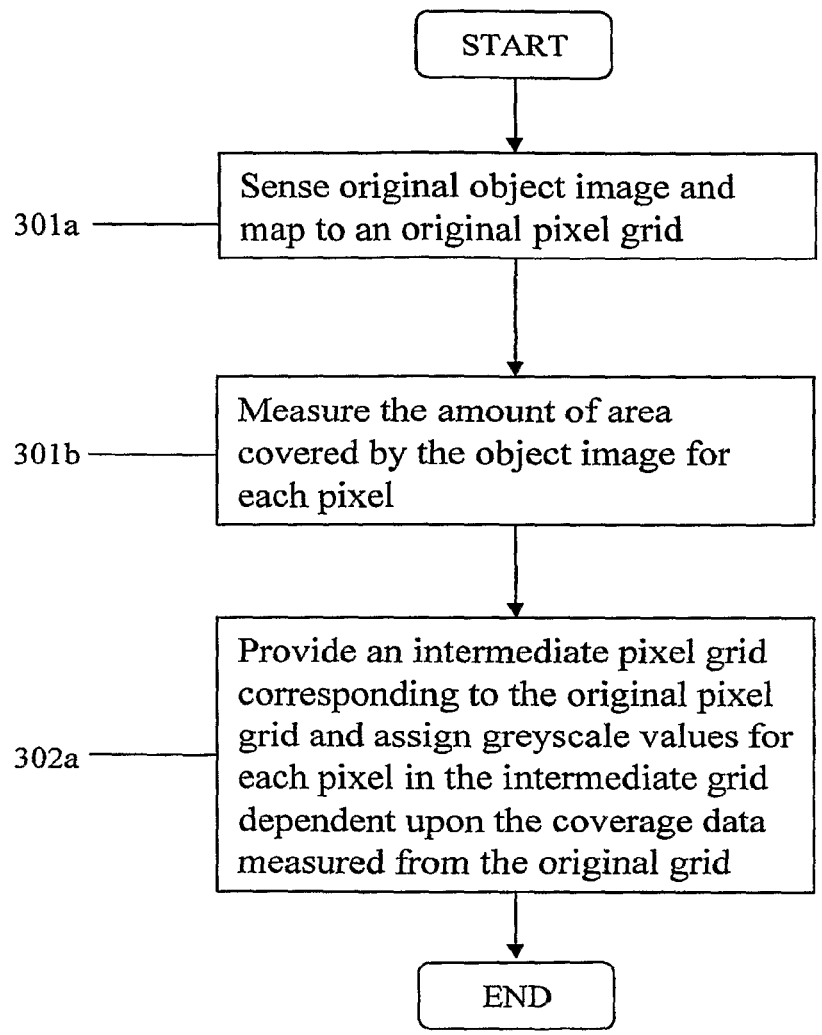
FIG. 4 is a flow diagram illustrating a method for reading an object, according to an embodiment of this invention.

In one embodiment, referring to FIG. 4 a rendering method 400 comprises an initial step 301a of sensing an original object image and mapping the image to an original pixel grid. In another embodiment the initial step 301a comprises the step of rendering an original object image instead of sensing it. In a subsequent step 301b the amount of area covered by the object image for each pixel in the original grid is measured. For example, for a black and white original object image, the amount of pixel area covered by 'black' is measured in one embodiment. In other embodiments, the 'white' area is measured.

Next, at step 302a an intermediate pixel grid is provided. In this embodiment, the intermediate grid has pixels of the same size as the original grid—this may not be the case in other embodiments, the grid pixel sizes might be different. For each pixel in the intermediate grid, a greyscale value is assigned. For each pixel, the greyscale value depends, upon the amount of coverage of a corresponding pixel by the original image in the original pixel grid. The greyscale value may be a value measured relative to any suitable scale. For example 0 to 225 (e.g. 0 being white and 255 being black) or 0 to 511 or 0 to 4095 or any other suitable range. For image processing purposes it will be appreciated that a relatively almost continuous greyscale representation can be provided by this process relative to prior systems for rendering such data in which binary techniques are used.

For example, referring to FIG. 5b, an alternative rendering method (not according to the present invention) is used to render an original black and white image (illustrated in FIG. 5a) comprising a sloped line, 500. The original image 500 is mapped to an original pixel grid 502. A further pixel grid 504 corresponding exactly to the original gird 502 is provided. Pixels of the further gird 504 are assigned a binary coverage value (e.g. 1=covered, 0=uncovered) dependent upon whether or not the centre of a corresponding pixel in the original grid 502 is covered by object 500 or not—if it is covered, then the corresponding intermediate pixel will be assigned a '1', if it is not covered it will be assigned a '0'. A final image 506 results from this process, as seen in FIG. 5b. This final image may be post-processed to recover some of the lost data (e.g. smooth slope of, the line). Processes for recovering such data include template matching. It will be appreciated that the final image 506 has lost a certain amount of smooth line form (continuous data) relative to the original image 500 which it represents.

FIGS. 6a and 6b illustrate how the rendering method of FIG. 4 renders the original image 601 according to this invention. Firstly, at step 301a the original image 601 is sensed and mapped to an original pixel grid 602.

At step 301b, the amount of coverage of each pixel of the original grid 602 is measured.

At step 302a an intermediate pixel grid 604 is provided. The pixels of the intermediate grid 604 are of the same size as the pixels of the original grid 602 in this embodiment. For each pixel in the intermediate grid 604, a greyscale value is assigned. This is represented in FIG. 6b. In this embodiment, the assigned greyscale values range from 0 to 10; 0=white, 10=black. An intermediate image 605 is formed on the intermediate grid.

In this embodiment the original image 601 comprises a binary graphics image. In other embodiments the original image may be a text image. Preferably the original image comprises a binary image.

Figures 7, 8:
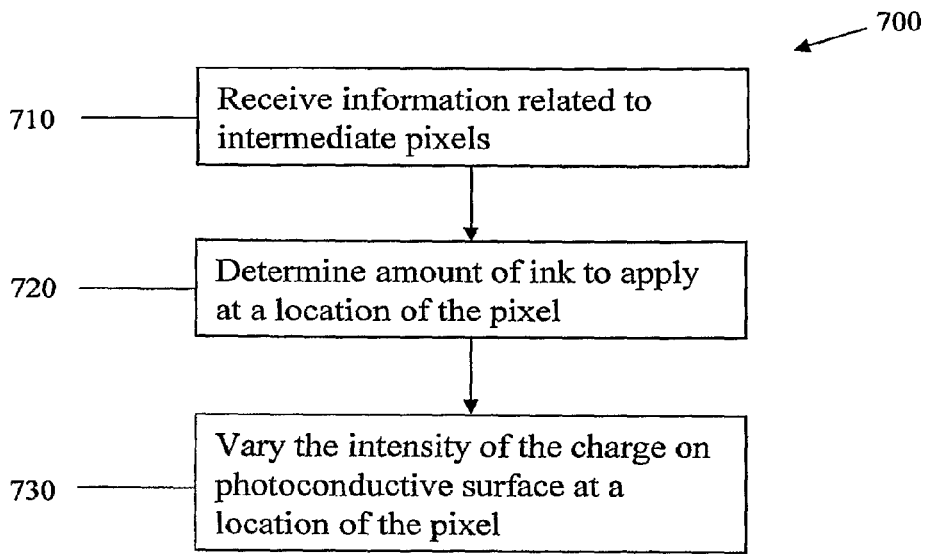
FIG. 7 is a flow diagram illustrating a method of printing an object according to an embodiment of this invention.
FIG. 8 is an example representation of a table lookup for determining laser intensity for a given greyscale value, according to an embodiment of this invention.

FIG. 7 is a flow diagram illustrating a method 700 for printing an image according to an embodiment of the invention. The method 700 for printing an image includes receiving 710 information relating to an intermediate pixel, having an assigned greyscale value, of the intermediate image 605. Receiving 71 information relating to an intermediate pixel comprises receiving a value relating to the greyscale of the pixel.

The method 700 for printing also includes determining 720 an amount of an ink to apply to a media at a location of the pixel in response to the information. The method 700 also includes varying 730 the laser exposure on a photoconductive surface at the location of the pixel. Varying the laser exposure on a photoconductive surface at the location of the pixel includes modulating the power level of a laser, such as laser 144 (shown in FIG. 1). In another embodiment varying the laser exposure on a photoconductive surface at the location of the pixel includes modulating the pulse width of a laser such as laser 144 (shown in FIG. 1).

In one embodiment, pixels are rendered by assigning greyscale values proportional to the coverage of corresponding pixels in the original image (as illustrated in FIGS. 6a and 6b). When this method of FIG. 7 receives this information at step 710, in one embodiment at steps 720 and 730 the amount of ink to be applied at each pixel location is proportional to the greyscale value and varying the laser intensity results in a final image 610 shown in FIG. 6c. In this example, partially exposed pixels are located adjacent fully exposed pixels—in such a situation, the reduction in laser power results in a partially exposed pixel providing partial exposure in a region adjacent the neighboring; fully exposed pixel, as illustrated in FIG. 6c. This phenomenon is used to accurately produce smooth, high resolution representations of original image data.

Advantageously, the present invention processes continuous data so that the continuous nature of the input data 600 is preserved to a greater extent than alternative rendering systems in which the continuous data first digitised 506 and then subsequently processed in order to re-introduce lost information (lost in the digitising process) relating to the continuous aspects (e.g. line slopes etc.).

Varying the laser exposure on a photoconductive surface at a location of the picture element 730, in one embodiment, includes the use of a table lookup. FIG. 8 is an example representation of a table lookup 800 for determining laser exposure for a given greyscale value of intermediate pixels according to an embodiment of this invention. The table lookup 800 includes a number of records. The record includes a record number 810, a greyscale value 812 for pixels of an intermediate grid, as well as two values associated with laser exposure. A first value of laser exposure is a power modulation level 814. In other words, for a given greyscale value 812, different power levels of the laser will be employed to draw an appropriate amount of ink or toner or pigment to the photoconductive surface, such as drum 148 (shown in FIG. 1). Another way to vary the laser exposure is by pulse width modulation of the laser. For a given greyscale value 812, a pulse width modulation value which will attract a selected amount of ink or toner or pigment to a photoconductive surface is set forth in the lookup table 800 (units of time). The pulse width modulation value 816 and the power modulation level 814 are generally set forth as values which are less than the value for fully charging a photoconductive spot with the laser. In other words, the power modulation level 814 and the pulse width modulation value 816 be expressed as a percentage of 100% of a laser output device value or as decimal number between zero and one. The lookup table 800 is typically stored in memory, such as memory 114, which is communicatively coupled to bus 122 in printer 100. As shown in FIG. 1, the formatter 118 or the print controller 112 can access the table lookup 800 in a memory 114 so that the laser drive signal on line 119 is varied when input to the laser 114 during a printing operation.

In some embodiments of the invention, the laser intensity may be adjusted from the value found in the table lookup 800. For example, even though a first pixel in a first intermediate image and a second pixel in a second intermediate image have the same greyscale value, the fact that the first pixel and the second pixel are embedded in different patterns may require additional adjustment of the laser intensity in order to produce the appropriate optical effect for both patterns (original images). In other words, the neighbouring pixels may have an effect on the final laser intensity value used to charge a spot on a photoconductive surface corresponding to the location of the pixel. The laser intensity is varied from the table lookup value to produce an image that is a more accurate rendition of the original and/or pleasing on the eye.

For example, consider a first pixel which is embedded in a first pattern. The first pixel may be required to have a greyscale value of 50%. The first pixel is surrounded by eight other pixels. In this example, these eight pixels are all fully exposed. Now, consider a second pixel embedded in a second pattern. The second pixel also has a greyscale value of 50%. The second pixel is surrounded by eight pixels which are not exposed in any way (i.e. their greyscale value is 0%). In this scenario the laser intensity required to print the first pixel will be different to the laser intensity required to print the second pixel due to the effect of surrounding pixels in the two patterns. In order to provide the correct desired laser intensity; a lookup table is provided which takes into account the greyscale condition of surrounding pixels. A number of different lookup tables maybe provided for different surrounding pixel combinations. For example if a pixel to be printed is surround by eight pixels, one of which is a fully exposed pixel (100% greyscale value) and another pixel is desired to be printed which has seven surrounding fully exposed pixels then the laser intensity required to print the two pixels will be different and different lookup tables can be used which correspond to a pixel having one or eight surrounding fully exposed pixels respectively.

Also, in some embodiments there are different lookup tables provided depending upon the specific location of a surrounding pixel. For example, consider a first pixel which has eight surrounding pixels, one of which is fully exposed and in which the fully exposed pixel is aligned horizontally relative to the first pixel. Consider also a second pixel having eight surrounding pixels, one of which is fully exposed and in which the fully exposed pixel is aligned vertically with the second pixel. In this example, the scan direction of the laser is horizontal. Therefore a different laser intensity is used when printing the first pixel and the second pixel to account for a variation in final intensity which arises as a result of the scan direction asymmetry. Therefore different lookup tables can be used to take into account specific surrounding pixel patterns on the basis of surrounding pixel location as well as surrounding pixel intensity.

In another embodiment, the assigned laser power maybe more than 100% of the nominal laser power. For example, if a first pixel which is required to be assigned a greyscale value has eight surrounding pixels, none of which are exposed, post-processing may be applied to increase the laser intensity which is used to print the pixel above 100% of the nominal laser power suggested by the lookup fable.

Referring to FIGS. 9a, 9b and 9c, FIG. 9a shows an intermediate image comprising pixels which have been rendered to have greyscale values according to this invention.

FIG. 9b shows an intermediate image rendered according to the bas alternative rendering technique (not according to this invention) previously described where a pixel is black if its corresponding original pixel has its centre covered.

FIG. 9c shows a subsequent intermediate image which is the result of applying existing loss recovery rendering techniques to the image of FIG. 9b:

All the images in FIGS. 9a, 9b and 9c are rendered versions of the same original image—a flat sloping line.

FIGS. 10a, 10b and 10c show light profiles corresponding to light impinging on the drum 148 for the digital patterns of FIGS. 9a, 9b and 9c respectively.

For ease of comparison, the dotted lines 1000a, 1000b and 1000c represent a particular threshold light intensity. It will be noticed that FIG. 10b shows a threshold profile 1000b having a significant kink at its centre. This kink may translate to a step in a final printed image. The corrected threshold profile 1000c is slightly better in that it provides a smoother transition but it is not as smooth and as close to the intended original continuous angle as the profile 1000a (according to the present invention). The profile 1000c provides a widening at its centre whereas the profile 1000a is relatively uniform in width (as desired).

Accordingly, in some embodiments practically continuous addressability print of graphic objects is achieved by the method of this invention. In addition, digitisation artefacts, e.g. in almost horizontal lines, are substantially removed.

In some embodiments of the invention arbitrary selection of printer addressability is allowed. For example, for a printer of a first resolution (e.g. an 800 dpi press), printing at effectively other resolutions (e.g. 2400 dpi, 1200 dpi or 600 dpi) can be achieved if desired.

In some embodiments of the invention, the original pixel grid comprises pixels which are different in size to pixels which form the intermediate pixel grid. Standard algorithms may be used to map the original pixel grid resolution to the intermediate pixel grid resolution.

FIG. 11 illustrates an example computer system used in conjunction with certain embodiment of the invention. As illustrated in FIG. 11, computer system 1100 comprises processor(s) 1102. The computer system 1100 also includes a memory unit 1130, processor bus 1122, and input/output controller hub (ICH) 1124 are coupled to the processor bus 1122. The processor(s) 1102 may comprise any suitable processor architecture. The computer system 1100 may comprise one, two, three, or more processors, any of which may execute a set of instructions in accordance with embodiments of the present invention.

The memory unit 1130 includes an operating system 1140, which includes an I/O scheduling policy manager 1132 and I/O schedulers 1134. The memory unit 1130 stores data and/or instructions, and may comprise any suitable memory, such as a dynamic random access memory (DRAM), for example. The computer system 1100 also includes integrated drive electronics (IDE) drive(s) 1108 and/or other suitable storage devices. A graphics controller 1104 controls the display of information on a display device 1106, according to embodiments of the invention.

The Input/Output controller hub (ICH) 1124 provides an interface to I/O devices or peripheral components for the computer system 1100. The ICH 1124 may comprise any suitable interface controller to provide for any suitable communication link to the processor(s) 1102; memory unit 1130 and/or to any suitable device or component in communication with the ICH 1124. For one embodiment of the invention, the ICH 1124 provides suitable arbitration and buffering for each interface.

For one embodiment of the invention, the ICH 1124 provides an interface to one or more suitable integrated drive electronics (IDE) drives 1108, such as a hard disk drive (HDD) or compact disc read only memory (CD ROM) drive, or to suitable universal serial bus (USB) devices through one or more USB ports 1110. For one embodiment, the ICH 1124 also provides an interface to a keyboard 1112, a mouse 1114, a CD-ROM drive 1118, and one or more suitable devices through one or more firewire ports 1116. For one embodiment of the invention, the ICH 1124 also provides a network interface 1120 though which the computer system 1100 can communicate with other computers and/or devices.

In one embodiment, the computer system 1100 includes a machine-readable medium that stores a set of instructions (e.g., software) embodying any one, or all, of the methodologies for dynamically loading object modules described herein. Furthermore, software can reside, completely or at least partially, within memory unit 1130 and/or within the processor(s) 1102.

A machine-readable medium that provides instructions that, when executed by a machine, cause the machine to perform operations that include the method described with reference to FIG. 3 and FIG. 4.

A machine-readable medium that provides instructions that, when executed by a machine, cause the machine to perform operations that include receiving greyscale information related to a pixel, and determining the laser exposure on a photoconductive plate at a location on the photoconductive plate in response to the information. The machine-readable medium further causes the machine to perform an operation comprising discharging a charge of less than full intensity by modulating the power level of a laser. In some embodiments, the machine-readable medium further causes the machine to perform an operation comprising placing a charge of less than full intensity by modulating the pulse width of a laser.

Thus, a system, method, and machine-readable medium including instructions for Input/Output scheduling have been described. Although the present invention has been described with reference to specific example embodiments, it will be evident that various modifications and changes may be made to these embodiments without departing from the broader scope of the invention. Accordingly, the specification and drawings are to be regarded in an illustrative rather than a restrictive sense.

Although specific embodiments have been illustrated and described herein, those of ordinary skill in the art will appreciate that any arrangement calculated to achieve the same purpose can be substituted for the specific embodiments shown. This disclosure is intended to cover any and all adaptations or variations of various embodiments of the invention. It is to be understood that the above description has been made in an illustrative fashion, and not a restrictive one. Combinations of the above embodiments, and other embodiments not specifically described herein will be apparent to those of skill in the art upon reviewing the above description. The scope of various embodiments of the invention includes any other applications in which the above structures and methods are used. Therefore, the scope of various embodiments of the invention should be determined with reference to the appended claims, along with the full range of equivalents to which such claims are entitled.

The invention claimed is:

1. Electrophotographic printing method for converting an original two-tone image into a final, two-tone pixellated image for printing on an electrophotographic printer arranged to print two-tone images and capable of printing partial area exposed pixels, the electrophotographic printing method comprising:
   mapping the original image onto an original pixel grid;
   measuring the amount of area of each pixel in the original pixel grid covered by one of the two tones of the original image;
   antialiasing the original image into an intermediate pixellated image comprising greyscale pixels having assigned greyscale values, wherein the greyscale values depend upon the amount of coverage of a corresponding pixel in the original pixel grid by the one of the two tones of the original image;
   translating the intermediate image into the final, two-tone pixellated image by translating the assigned greyscale values into exposure values indicative of the amount of pixel area for a corresponding pixel or pixels in the final image to be covered by one of the two tones in the final image; and
   exposing a photoconductive plate according to the exposure values by modulating a laser in terms of intensity;
   wherein translating the intermediate image into the final, two-tone pixellated image comprises translating a greyscale value corresponding to any pixel in the original image that is partially covered by the one of the two tones in the original image into a partial exposure value indicative of a partial pixel area of a corresponding pixel in the final image to be covered by the one of the two tones in the final image.

2. A method according to claim 1, wherein the assigned greyscale value is determined by:
   mapping the original image to an original pixel grid, which corresponds to an intermediate pixel grid associated with the intermediate image; and
   for pixels in the intermediate pixel grid assigning greyscale values dependent upon the amount of coverage of a corresponding pixel or pixels in the original pixel grid by the original image.

3. A method according to claim 1 wherein translating the intermediate image into the final, two-tone pixellated image comprises comparing a pixel or pixels having greyscale values to a lookup table which maps said pixel or pixels to a corresponding pixel or pixels having predetermined exposure values in the final image, the exposure values being arranged to provide the pixel area exposure.

4. A method according to claim 2 wherein the original pixel grid comprises pixels of the same size as pixels, which form the intermediate pixel grid.

5. A method according to claim 1 wherein the assigned greyscale value for a particular pixel is dependent upon:
   configuration of surrounding pixels; or
   greyscale value intensity of surrounding pixels; or
   location of surrounding pixels; or
   any combination of the above.

6. A method according to claim 1 wherein the original image comprises a binary object, such as text or graphics.

7. Printing method comprising the image processing method of claim 1 and;
   printing the final image by varying laser exposure for pixels in the final image depending upon the relevant area exposure values.

8. A rendering machine arranged to convert an original image into a final, two-tone pixellated image using the method of claim 1.

9. A printer arranged to print a final two-tone pixellated image, the printer comprising a laser capable of variably exposing pixels and:

comprising the rendering machine of claim 8; or
arranged to receive the final two-tone pixellated image from the rendering machine of claim 8.

10. The printer of claim 9 comprising a power width modulation laser or a variable power intensity laser.

11. A non-transitory machine-readable medium, comprising instructions, that when executed on a processing circuit instruct a control circuit to perform an electrophotographic printing method for converting an original two-tone image into a final, two-tone pixellated image for printing on an electrophotographic printer arranged to print two-tone images and capable of printing partial area exposed pixels, the electrophotographic printing method comprising:
 mapping the original image onto an original pixel grid;
 measuring the amount of area of each pixel in the original pixel grid covered by one of the two tones of the original image;
 antialiasing the original image into an intermediate pixellated image comprising greyscale pixels having assigned greyscale values, wherein the greyscale values depend upon the amount of coverage of a corresponding pixel in the original pixel grid by the one of the two tones of the original image;
 translating the intermediate image into the final, two-tone pixellated image by translating the assigned greyscale values into exposure values indicative of the amount of pixel area for a corresponding pixel or pixels in the final image to be covered by the one of the two tones in the final image; and
 exposing a photoconductive plate according to the exposure values by modulating a laser in terms of intensity;
 wherein translating the intermediate image into the final, two-tone pixellated image comprises translating a greyscale value corresponding to any pixel in the original image that is partially covered by the one of the two tones in the original image into a partial exposure value indicative of a partial pixel area of a corresponding pixel in the final image to be covered by the one of the two tones in the final image.

12. Liquid electrophotographic printer arranged to print two-tone images and capable of printing partial area exposed pixels, comprising
 a photoconductive drum,
 a toner or ink dispenser,
 a laser for emitting light onto the photoconductive drum, and arranged to be modulated in terms of intensity for depleting a portion of the charge of the drum in accordance with the laser modulation,
 a control circuit arranged to instruct the printer to perform an electrophotographic printing method for converting an original two-tone image into a final, two-tone pixellated image for printing, the electrophotographic printing method comprising:
 mapping the original image onto an original pixel grid;
 measuring the amount of area of each pixel in the original pixel grid covered by one of the two tones of the original image;
 antialiasing the original image into an intermediate pixellated image comprising greyscale pixels having assigned greyscale values, wherein the greyscale values depend upon the amount of coverage of a corresponding pixel in the original pixel grid by the one of the two tones of the original image;
 translating the intermediate image into the final, two-tone pixellated image by translating the assigned greyscale values into exposure values indicative of the amount of pixel area for a corresponding pixel or pixels in the final image to be covered by the one of the two tones in the final image; and
 exposing a photoconductive plate according to the exposure values by modulating a laser in terms of intensity;
 wherein translating the intermediate image into the final, two-tone pixellated image comprises translating a greyscale value corresponding to any pixel in the original image that is partially covered by the one of the two tones in the original image into a partial exposure value indicative of a partial pixel area of a corresponding pixel in the final image to be covered by the one of the two tones in the final image.

* * * * *